US011137025B2

(12) United States Patent
Dent et al.

(10) Patent No.: US 11,137,025 B2
(45) Date of Patent: Oct. 5, 2021

(54) SPLIT TAPERED ROLLER BEARING

(71) Applicant: The Timken Company, North Canton, OH (US)

(72) Inventors: Nick Dent, Newark-on-Trent (GB); Brian Werner, Carrollton, OH (US); Matthew Wilmer, North Canton, OH (US); Carl H. Hager, Massillon, OH (US); Daniel F. Stanciu, Ploiesti (RO)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 17/187,091

(22) Filed: Feb. 26, 2021

(65) Prior Publication Data

US 2021/0180647 A1 Jun. 17, 2021

Related U.S. Application Data

(62) Division of application No. 16/960,962, filed as application No. PCT/US2018/042798 on Jul. 19, 2018, now Pat. No. 10,968,948.

(51) Int. Cl.
*F16C 33/60* (2006.01)
*F16C 19/38* (2006.01)
(Continued)

(52) U.S. Cl.
CPC ............ *F16C 19/385* (2013.01); *F03D 80/70* (2016.05); *F16C 33/366* (2013.01);
(Continued)

(58) Field of Classification Search
CPC .... F16C 19/385; F16C 19/386; F16C 33/366; F16C 33/585; F16C 33/60; F16C 33/7813;
(Continued)

(56) References Cited

U.S. PATENT DOCUMENTS

| 750,715 A | 1/1904 | Sleeman |
| 1,715,268 A | 5/1929 | Ayers, Jr. |

(Continued)

FOREIGN PATENT DOCUMENTS

| DE | 3811970 A1 | 10/1989 |
| DE | 102010037331 A1 | 3/2012 |

(Continued)

OTHER PUBLICATIONS

International Search Report and Written Opinion for Application No. PCT/US2018/042798 dated Apr. 4, 2019 (27 pages).

*Primary Examiner* — Phillip A Johnson
(74) *Attorney, Agent, or Firm* — Michael Best & Friedrich LLP

(57) ABSTRACT

A bearing assembly includes a split inner race ring configured to be installed on a shaft and defines two raceways for supporting rolling elements. A split clamping band is configured to be installed over the split inner race ring to secure the split inner race ring on the shaft. A split seal wear ring is configured to be installed on an outer diameter surface of the split clamping band. An engagement interface between the split clamping band and the split seal wear ring includes a boss on one of the split clamping band and the split seal wear ring, and an aperture on the other one of the split clamping band and the split seal wear ring. The aperture is sized and configured to receive the boss for positioning the split seal wear ring on the split clamping band.

15 Claims, 12 Drawing Sheets

(51) Int. Cl.
  *F03D 80/70* (2016.01)
  *F16C 33/36* (2006.01)
  *F16C 33/58* (2006.01)

(52) U.S. Cl.
  CPC ............ *F16C 33/585* (2013.01); *F16C 33/60* (2013.01); *F05B 2240/50* (2013.01); *F16C 2360/31* (2013.01)

(58) Field of Classification Search
  CPC ... F16C 33/7843; F16C 2360/31; F03D 80/70
  See application file for complete search history.

(56) References Cited

U.S. PATENT DOCUMENTS

| | | | |
|---|---|---|---|
| 1,967,821 A * | 7/1934 | Hess | B21K 1/04 |
| | | | 29/898.066 |
| 2,528,987 A * | 11/1950 | Albett | F16C 33/605 |
| | | | 384/570 |
| 2,850,311 A | 9/1958 | Mansfield | |
| 3,166,363 A | 1/1965 | Kay | |
| 5,630,669 A | 5/1997 | Stewart | |
| 5,743,659 A | 4/1998 | Stewart | |
| 8,075,196 B2 | 12/2011 | Burner et al. | |
| 9,140,296 B2 | 9/2015 | Caspall | |
| 9,512,881 B2 | 12/2016 | Katayama et al. | |
| 2008/0267553 A1 | 10/2008 | Earthrowl et al. | |
| 2011/0110618 A1 | 5/2011 | Proeschel | |
| 2011/0255820 A1 | 10/2011 | Caspall et al. | |
| 2012/0211470 A1 | 8/2012 | Webster et al. | |
| 2017/0097046 A1 | 4/2017 | Hadden | |

FOREIGN PATENT DOCUMENTS

| | | |
|---|---|---|
| EP | 2796739 A1 | 10/2014 |
| EP | 1519058 B1 | 12/2014 |
| GB | 334044 A | 8/1930 |
| GB | 2323132 A | 9/1998 |
| GB | 2448712 A | 10/2008 |
| GB | 2492368 A | 1/2013 |
| JP | 2007218394 A | 8/2007 |
| JP | 4027047 B2 | 12/2007 |
| JP | 2009063101 A | 3/2009 |
| KR | 100975676 B1 | 8/2010 |
| WO | 2006043411 A1 | 4/2006 |
| WO | 2017007922 A1 | 1/2017 |

* cited by examiner

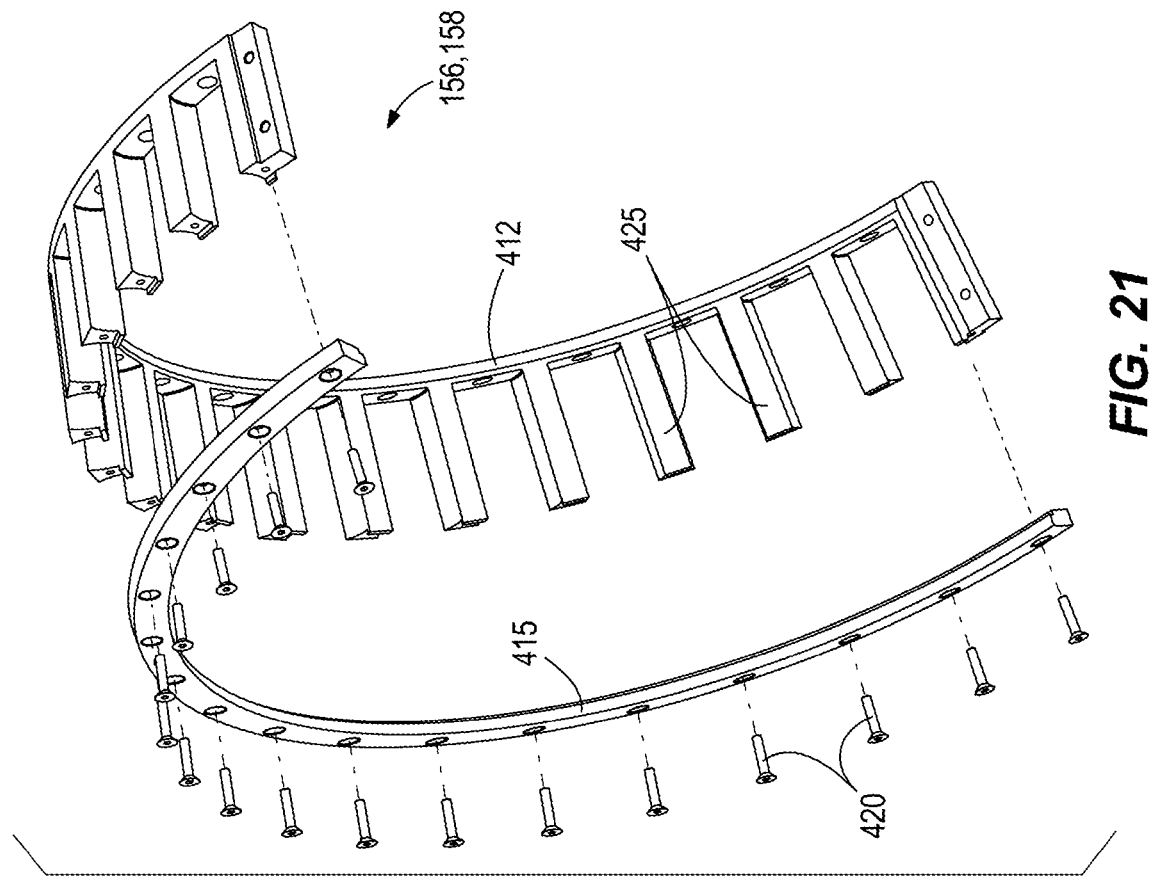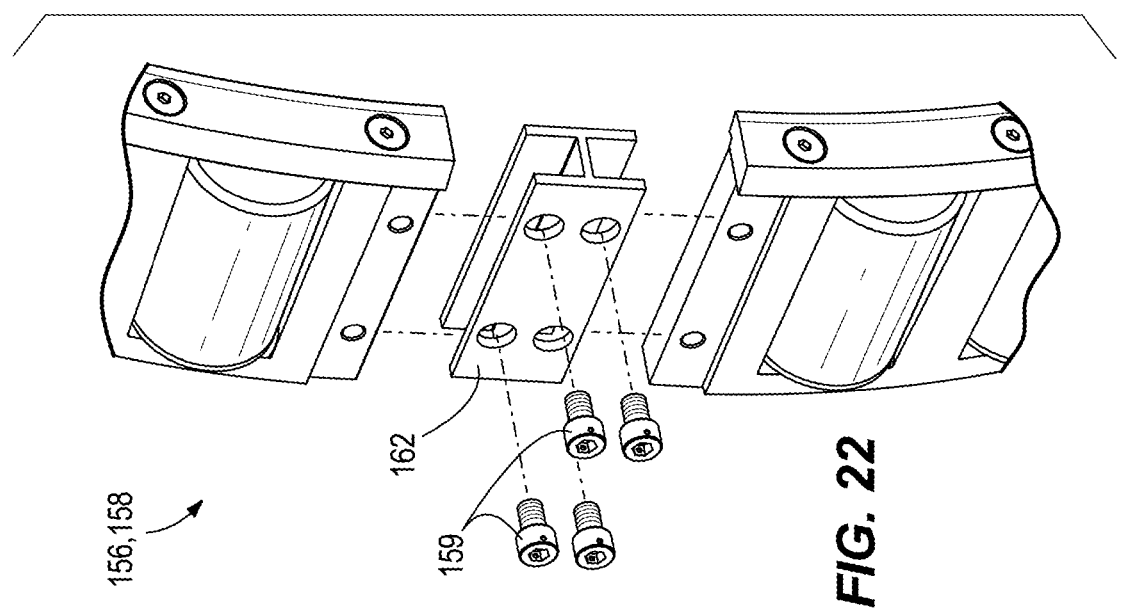

SPLIT TAPERED ROLLER BEARING

RELATED APPLICATIONS

This application is a divisional of U.S. patent application Ser. No. 16/960,962 filed Jul. 9, 2020, which is a 371 national phase of PCT/US2018/024798 filed Jul. 19, 2018, and hereby incorporates by reference the entire content of those applications.

BACKGROUND

The present invention relates to bearings, and more specifically to split bearings or pillowblock bearings.

Split bearings are advantageous when the supporting shaft ends cannot be accessed for normal bearing removal or replacement. Split bearings are often used in industries such as power generation, pulp and paper, mining, cement, metals, marine and waste water. Common applications are pulverizers, crushers, fans, blowers, centrifuges, conveyors, and marine propulsion shafts. Another common application is split pillowblock bearings used for supporting a mainshaft of a wind turbine.

FIG. 1 illustrates a conventional wind turbine drive train configuration 10 including a three-point mounting system 12. Specifically, the wind turbine drive train configuration 10 supports turbine blades 15 coupled to a nosecone 20, which in turn, is coupled to a wind turbine mainshaft 25 on three points of support. A first support is an upwind pillowblock 30 that normally contains a two-row spherical roller bearing 32 and is attached to a bedplate 35. Second and third supports are downwind and are two attachment points 40, 45 (e.g., torque arms) that are attached to the bedplate 35. Each torque arm 40, 45 is positioned on a side of a gearbox 50.

FIG. 2 illustrates a four-point mounting system 55 of another conventional wind turbine drive train configuration 10'. The four-point mounting system 55 supports the mainshaft 25 upwind and downwind on two pillowblocks 30. Each pillowblock 30 contains a two-row spherical roller bearing 32. Combined, there are four-supporting bearing rows in a four-point mounting.

In service, it often becomes necessary to perform maintenance and to replace the spherical roller bearing 32 in at least one of the pillowblocks 30. It has become known to replace existing bearings (e.g., spherical roller bearings) with split, tapered roller bearings. Using split bearings enables the bearings to be replaced without having to disconnect the mainshaft from the rest of the wind turbine. A double row tapered roller bearing inside the pillowblock housing has been used as a preferred design because it can be preloaded to optimize load zones in both rows for improving bearing life and controlling the radial and axial motion of the rotor assembly. One such double row tapered roller bearing is described in PCT Published Application No. WO 2017/007922, the entire content of which is hereby incorporated herein by reference.

SUMMARY

In one embodiment, the invention provides a bearing assembly. A split inner race ring has first and second components configured to be installed and connected together on a shaft, each component of the split inner race ring defining two raceways for supporting rolling elements in a two-row orientation. A split clamping band has first and second components configured to be installed and connected together over the split inner race ring to secure the split inner race ring on the shaft. A split seal wear ring has first and second components configured to be installed and connected together on an outer diameter surface of the split clamping band. An engagement interface between the split clamping band and the split seal wear ring includes a boss on one of the split clamping band and the split seal wear ring, and an aperture on the other one of the split clamping band and the split seal wear ring, the aperture sized and configured to receive the boss for positioning the split seal wear ring on the split clamping band. The assembly further includes a sealing arrangement having a seal in sealing engagement with an outer diameter surface of the split seal wear ring. A first split outer race ring has first and second components configured to be installed around the shaft, each component of the first split outer race ring defining a raceway for supporting a first row of the two rows of rolling elements. A second split outer race ring has first and second components configured to be installed around the shaft, each component of the second split outer race ring defining a raceway for supporting a second row of the two rows of rolling elements.

The invention further provides a method of installing a split seal wear ring onto a split clamping band of a split bearing assembly. An engagement interface between the split clamping band and the split seal wear ring includes a boss on one of the split clamping band and the split seal wear ring, and a slot on the other one of the split clamping band and the split seal wear ring. The slot includes an entry portion that opens to an axial edge of the respective split clamping band or the split seal wear ring, and a locking portion circumferentially offset from the entry portion. The method includes aligning the entry portion of the slot with the boss, with the split seal wear ring spaced axially from the split clamping band. Moving the split seal wear ring axially such that the boss is received in the entry portion of the slot, and rotating the split seal wear ring circumferentially relative to the split clamping band such that the boss is received in the locking portion of the slot.

The invention further provides a bearing assembly. A split inner race ring has first and second components configured to be installed and connected together on a shaft, each component of the split inner race ring defining two raceways for supporting rolling elements in a two-row orientation, and a central rib between the two raceways. The first and second components of the split inner race ring mate at a V-shaped split line. The assembly further includes a first split outer race ring having first and second components configured to be installed around the shaft. Each component of the first split outer race ring defines a raceway for supporting a first row of the two rows of rolling elements. A second split outer race ring has first and second components configured to be installed around the shaft. Each component of the second split outer race ring defines a raceway for supporting a second row of the two rows of rolling elements.

In yet another embodiment, the invention provides a bearing assembly. A split inner race ring has first and second components configured to be installed and connected together on a shaft, each component of the split inner race ring defining two raceways for supporting rolling elements in a two-row orientation, and a central rib between the two raceways. The first and second components of the split inner race ring mate at split line, and the central rib includes a rib face along which the rolling elements slide. At the split line, the rib face has a relief formed at an outer diameter portion of the rib face that is larger than any relief formed at an inner diameter portion of the rib face. The assembly further includes a first split outer race ring having first and second components configured to be installed around the shaft.

Each component of the first split outer race ring defines a raceway for supporting a first row of the two rows of rolling elements. A second split outer race ring has first and second components configured to be installed around the shaft. Each component of the second split outer race ring defines a raceway for supporting a second row of the two rows of rolling elements.

The invention further provides a bearing assembly with a split inner race ring having first and second components configured to be installed and connected together on a shaft, each component of the split inner race ring defining two raceways for supporting rolling elements in a two-row orientation. The first and second components of the split inner race ring mate at a split line when positioned around the shaft and together define a bore configured to receive the shaft. The bore is coated with an anti-fretting coating having an anti-friction material with a solid lubricant. The assembly further includes a first split outer race ring having first and second components configured to be installed around the shaft, each component of the first split outer race ring defining a raceway for supporting a first row of the two rows of rolling elements, and a second split outer race ring having first and second components configured to be installed around the shaft, each component of the second split outer race ring defining a raceway for supporting a second row of the two rows of rolling elements.

The invention further provides a cage assembly for a split tapered bearing. The cage assembly includes a split body portion having first and second body components configured to be installed and connected together on the split tapered bearing, each of the body components including a plurality of bridges. The cage assembly further includes a split flange having a first flange component coupled to the bridges of the first body component, and a second flange component coupled to the bridges of the second body component. A link coupled to a bridge of the first body component and to a bridge of the second body component secures the first and second body components together.

Other aspects of the invention will become apparent by consideration of the detailed description and accompanying drawings.

BRIEF DESCRIPTION OF THE DRAWINGS

FIG. 21 is a partial exploded view of the cage assembly of FIG. 20.

FIG. 22 is another partial exploded view of the cage assembly of FIG. 20.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

This invention was developed originally as a split pillowblock bearing used for supporting a mainshaft of a wind turbine and will be described as used in that application. However, this invention can also be used in other applications benefitting from split bearings in both pillowblock and non-pillowblock applications. For example, split bearings are often used in industries such as power generation, pulp and paper, mining, cement, metals, marine and waste water. Common applications are pulverizers, crushers, fans, blowers, centrifuges, conveyors, and marine propulsion shafts.

Figure 1:
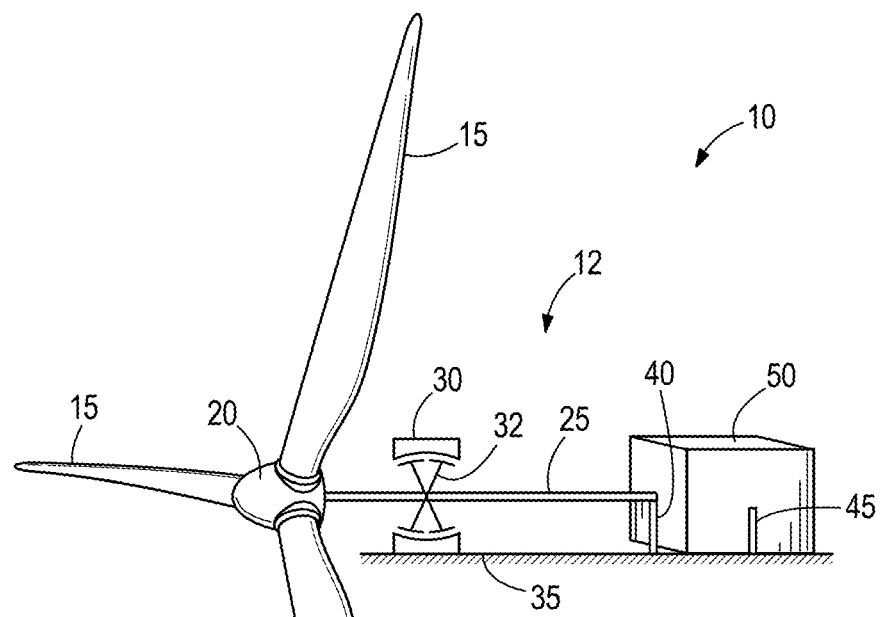
FIG. 1 illustrates a conventional three-point mounting arrangement for a wind turbine mainshaft.
Figure 2:
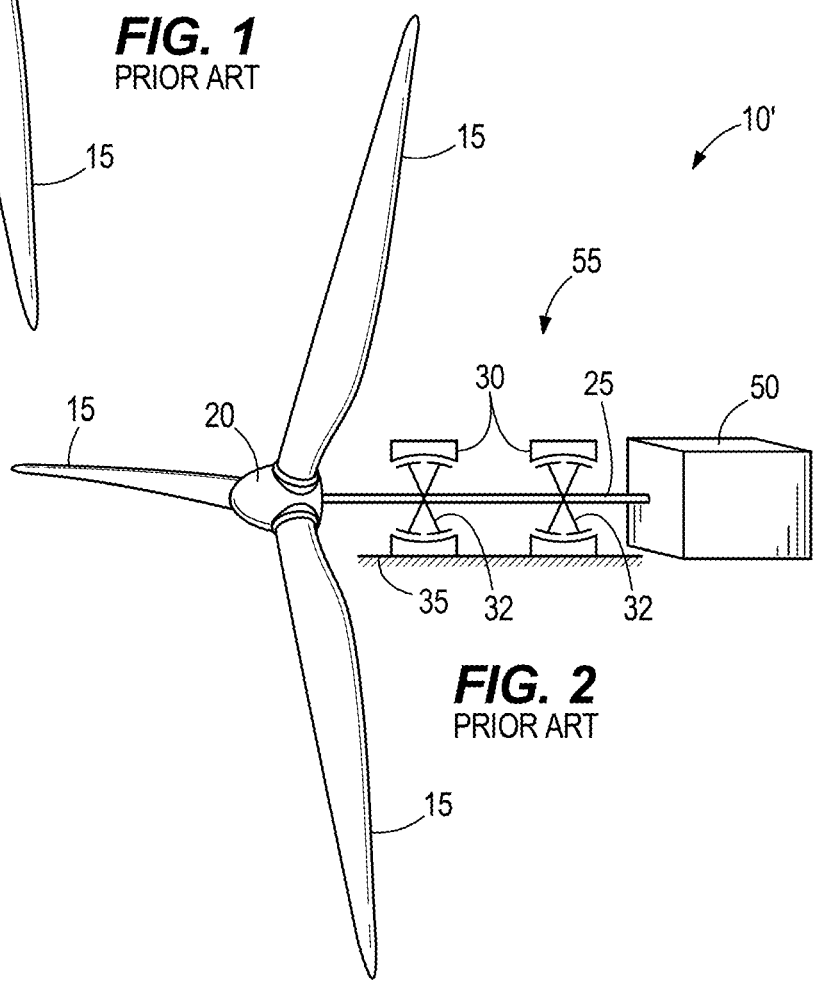
FIG. 2 illustrates a conventional four-point mounting arrangement for a wind turbine mainshaft.
Figure 3:
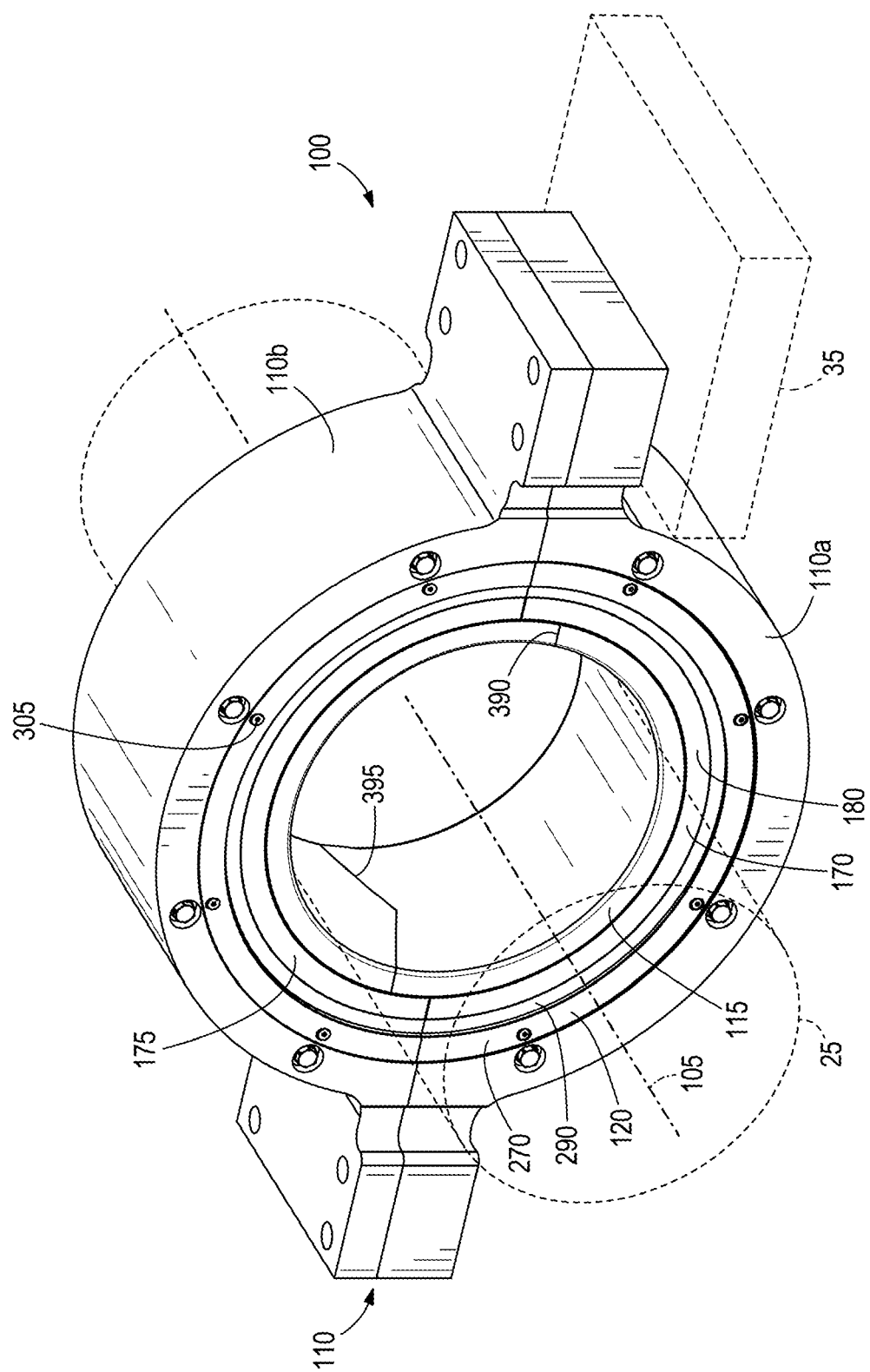
FIG. 3 is a perspective view of a split pillowblock and bearing assembly configured to rotatably support a wind turbine mainshaft.
Figure 4:
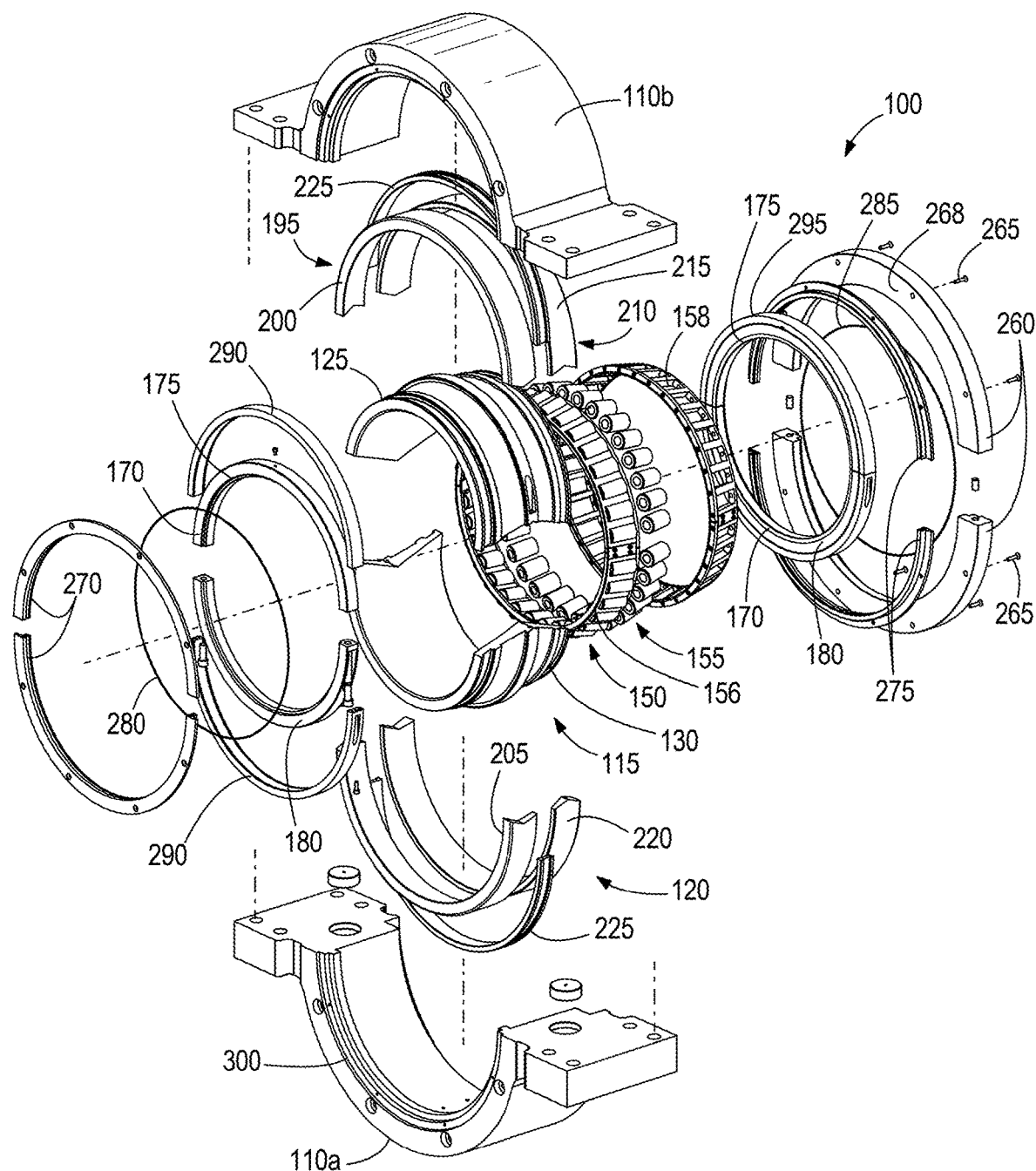
FIG. 4 is an exploded view of the split pillowblock and bearing assembly of FIG. 3.
Figure 5:
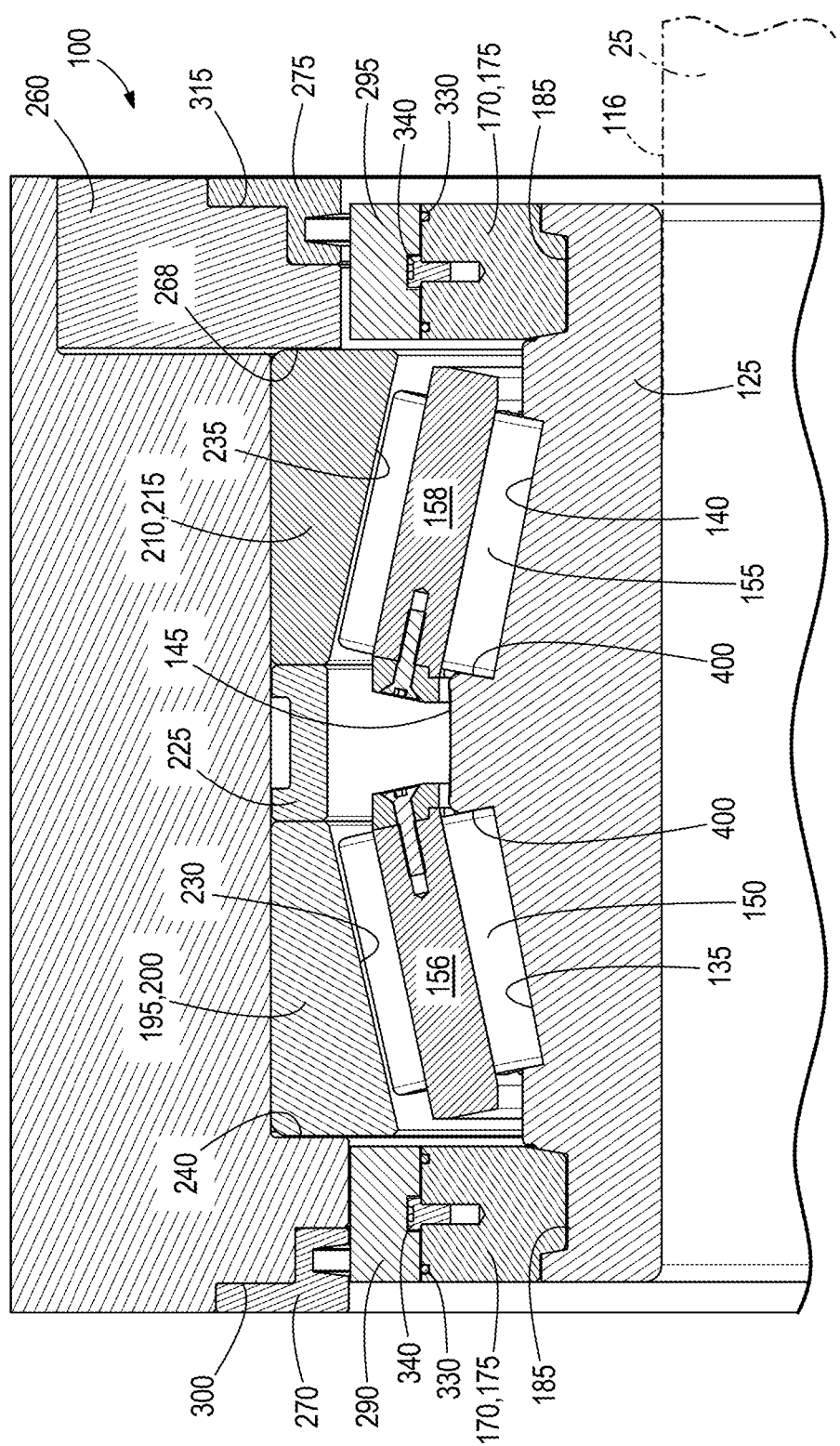
FIG. 5 is a partial section view of the split pillowblock and bearing assembly taken through line 5-5 of FIG. 3.
Figure 6:
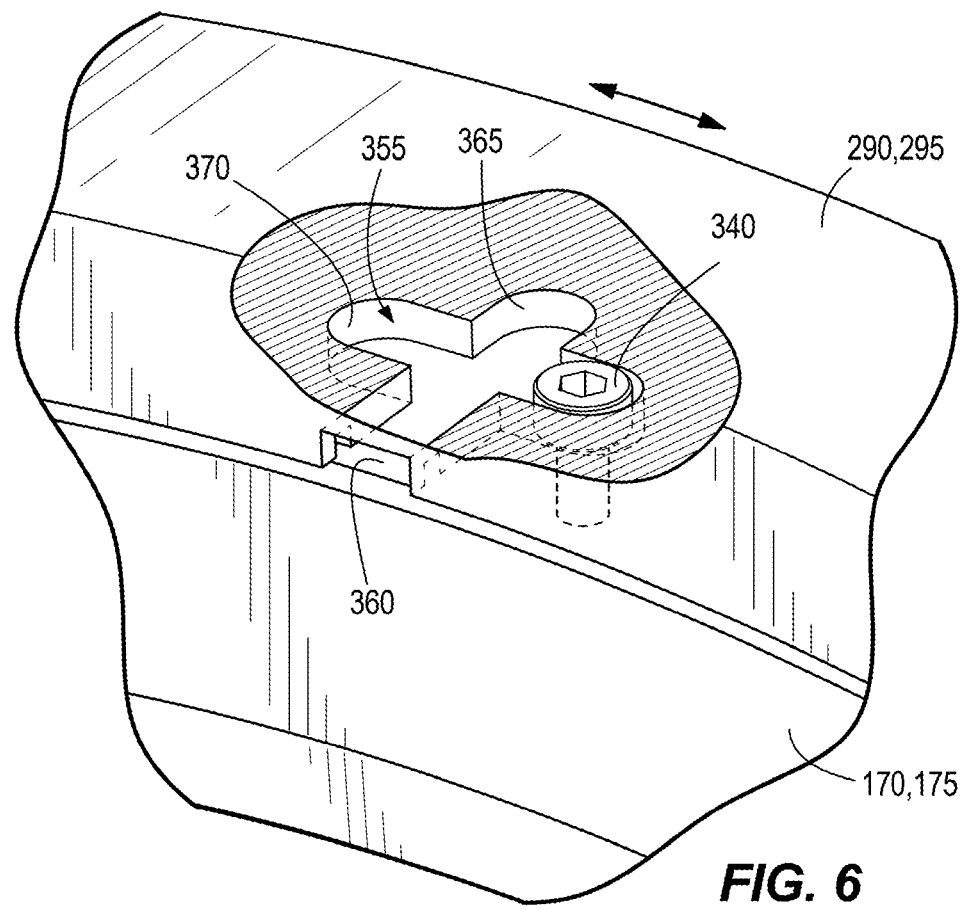
FIG. 6 is a partial perspective view illustrating a seal wear ring mounted on a clamping band, and partially broken away to illustrate an engagement feature in the locked and unlocked positions.
Figure 7:
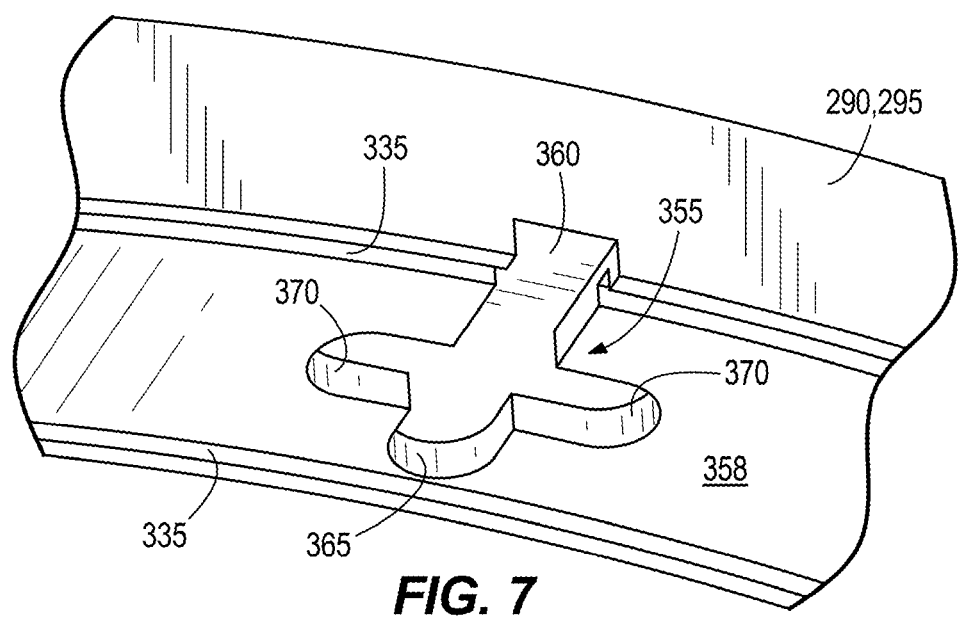
FIG. 7 is partial perspective view of the seal wear ring of FIG. 6 showing a portion of the engagement feature on the inner bore.

FIGS. 3-5 illustrate a split pillowblock and bearing assembly 100 coupled to the wind turbine mainshaft 25 about a bearing central axis 105 (see FIG. 3). The bearing assembly 100 can be a replacement to an existing spherical or other type of bearing being removed from the wind turbine, or can be an original bearing in a newly-constructed wind turbine. Referring to FIGS. 3 and 4, split housing is defined by pillowblocks (i.e., a lower pillowblock 110*a* and an upper pillowblock 110*b*) fixable to the bedplate 35 of the wind turbine 10 by pillowblock bolts (not shown). In the illustrated embodiment, eight pillowblock bolts are used to fix the pillowblock 110 to the bedplate 35. The illustrated split pillowblock and bearing assembly 100 includes an inner race ring assembly 115 coupled to a bearing seat 116 (FIG. 5) of the mainshaft 25 for rotational movement with the mainshaft 25. The bearing seat 116 of the mainshaft 25 is the surface area of the mainshaft 25 that directly contacts the inner race ring assembly 115. The split pillowblock and bearing assembly 100 also includes an outer race ring assembly 120 fixed to the pillowblock 110 and positioned between the lower and upper pillowblocks 110*a*, 110*b* and the inner race ring assembly 115.

The inner race ring assembly 115 defines a two-piece inner race ring having first and second inner ring halves 125, 130 that are connected together about the mainshaft 25 using bolts (not shown). Each inner ring half 125, 130 spans about 180 degrees in arc length and includes two inner raceways 135, 140 (see FIG. 5) that are separated by a central rib 145. First and second series of rolling elements 150, 155 (e.g., tapered rollers) are positioned within a corresponding inner raceway 135, 140. This configuration is often referred to as a "tapered double inner" or TDI race. The central rib 145 is sized and configured to guide and separate the series of rolling elements 150, 155 about the bearing central axis 105. In addition, the first series of rolling elements 150 are positioned or spaced about the inner ring halves 125, 130, and therefore about the bearing central axis 105, by a first two-piece cage 156. The second series of rolling elements 155 are also positioned or spaced about the inner ring halves 125, 130, and therefore about the bearing central axis 105, by a second two-piece cage 158. The two pieces of each cage 156, 158 are rigidly jointed together by fasteners 159. In particular, cage links 162 (FIGS. 20 and 22) span between the two pieces of each cage 156, 158 for the fasteners 159 to rigidly couple the two pieces of each cage 156, 158 together. In one embodiment, roller retainers may temporarily hold the rolling elements 150, 155 within the corresponding cage 156, 158 during assembly of the split pillowblock and bearing assembly 100. More detail regarding the split cages 156, 158 is provided below.

Once the inner ring halves 125, 130 are connected together about the mainshaft 25 by the bolts, corresponding inner raceways 135, 140 of each inner ring half 125, 130 align to form a continuous inner raceway 135, 140. In other embodiments, the inner race ring assembly 115 may have more than two halves or portions (e.g., the inner race ring assembly 115 may include three portions spanning about 120 degrees in arc length).

With continued reference to FIGS. 3-5, the illustrated inner race ring assembly 115 is further coupled to the mainshaft 25 by clamping rings or bands 170 including first and second band halves 175, 180 coupled together by clamping band bolts (not shown). The illustrated clamping bands 170 are sized and configured to fix the inner ring halves 125, 130 relative to the mainshaft 25 to inhibit precession of the inner ring halves 125, 130 and the mainshaft 25. In other words, the clamping bands 170 provide an anti-precession mechanism to inhibit relative movement between the inner race ring assembly 115 and the mainshaft 25. Each of the first and second band halves 175, 180 are received within grooves or recesses 185 (see FIG. 5) of the inner ring halves 125, 130. In the illustrated embodiment, each inner raceway 135, 140 is positioned between the central rib 145 and one clamping band 170. The illustrated first and second band halves 175, 180 span less than 180 degrees in arc length such that split regions or gaps are provided between the first and second band halves 175, 180 when the first and second band halves 175, 180 are coupled to the inner race ring assembly 115. In the illustrated embodiment (see FIG. 3), the split regions are circumferentially offset from the split lines of the inner ring halves 125, 130. In other embodiments, the clamping bands 170 may have more than two halves or portions (e.g., the clamping bands 170 may include three portions spanning less than 120 degrees in arc length).

With reference to FIGS. 3-5, the illustrated outer race ring assembly 120 includes a first two-piece outer race ring 195, having a first upper half 200 and a second lower half 205, separated from a second two-piece outer race ring 210, having a first upper half 215 and a second lower half 220, by a two-piece outer race spacer 225. The illustrated first two-piece outer race ring 195 also includes a first outer raceway 230 that aligns with the first inner raceway 135 of the inner race ring assembly 115, and the illustrated second two-piece outer race ring 210 also includes a second outer raceway 235 that aligns with the second inner raceway 140 of the inner race ring assembly 115. As such, the first series of rolling elements 150 are engageable between the first inner and outer raceways 135, 230, and the second series of rolling elements 155 are engageable between the second inner and outer raceways 140, 235.

The illustrated first two-piece outer race ring 195 abuts a shoulder 240 of the upper and lower pillowblocks 110a, 110b to axially position the outer race ring 195 within the pillowblocks 110a, 110b. The spacer 225 abuts the first two-piece outer race ring 195 and the second two-piece outer race ring 210 abuts the spacer 225 opposite to the first two-piece outer race ring 195. In other embodiments, the outer race ring 195 may have more than two halves or portions (e.g., the outer race ring 195 may include three portions spanning less than 120 degrees in arc length).

With continued reference to FIGS. 3-5, the split pillowblock and bearing assembly 100 also includes a two-piece clamping plate 260 coupled to the pillowblocks 110a, 110b via a plurality of adjustable clamping members 265 (e.g., bolts). The clamping plate 260 axially retains the first two-piece outer race ring 195, the second two-piece outer race ring 210, and the spacer 225 between the shoulder 240 of the pillowblocks 110a, 110b and an axially inner surface 268 of the clamping plate 260. The clamping plate 260 and adjustable clamping members 265 also operate to preload the bearing assembly 100 to improve the life of the split pillowblock and bearing assembly 100. By presetting the width of the spacer 225 and adjusting the amount of torque applied to the adjustable clamping members 265, the axial position of the first and second outer race rings 195, 210 can be adjusted relative to the inner raceways 135, 140, thereby changing the preload on the rollers 150, 155, and hence the preload of bearing assembly 100. In other embodiments, the clamping plate 260 may have more than two halves or portions (e.g., the clamping plate 260 may include three portions spanning less than 120 degrees in arc length).

The split pillowblock and bearing assembly 100 also includes sealing arrangements at both axial ends of the bearing. As best seen in FIG. 5, first and second split seal carriers 270, 275 each include a groove that retains a respective split seal member 280, 285. The seal members 280, 285 sealingly engage and run on the outer diameter surfaces of respective split seal wear rings 290, 295, which are coupled to the respective clamping bands 170, as will be described in greater detail below. While split, the seal wear rings 290, 295 are assembled so that no gap is present at the split lines. As will be discussed below, this improves sealing and the life of the seal members 280, 285. The first seal carrier 270 is secured to an axial end face 300 of the pillowblock 110a, 110b via seal carrier fasteners 305 (see FIG. 3) received in threaded bores (not shown) formed in the axial end face 300 of the pillow block 110. The second seal carrier 275 is secured to an axial end face 315 of the split clamping plate 260 via seal carrier fasteners 320 received in threaded bores 325 formed in the axial end face 315. In other embodiments, the seal carriers 270, 275 may have more than two halves or portions (e.g., the seal carriers 270, 275 may include three portions spanning less than 120 degrees in arc length).

The assembly 100 includes several features that facilitate assembly and/or improve the expected operational life of the bearing. Each feature discussed below can be used independently of the other features, or in combination with one or more of the other features. It is not necessary to utilize all of the features together on an assembly. A first feature relates to the configuration and mounting technique for the seal wear rings 290, 295 upon the respective clamping bands 170. A complication to sealing is dealing with the gaps between the split rings. As discussed above, a gap is maintained between the inner ring halves 125, 130 to get the most effective clamp to the shaft 25. Likewise a gap is maintained between the split halves of the clamping bands 170. This gap can be closed on one side, but closing both sides reduces the effectiveness of the clamp to the shaft. For most effective sealing and for extending the seal life, the seal wear rings 290, 295 should have no gaps. The desire to maintain a gap for clamping and to eliminate the gaps for sealing prevents further integration of the clamping bands 170 and the seal wear rings 290, 295 into a single component.

Due to the stack up of shaft 25 diameter size, inner ring 125, 130 bore, inner ring 125, 130, clamping band groove 185 diameter, clamping band 170 internal diameter, width and outside diameter, the final assembled diameter that the seal wear rings 290, 295 must mate with cannot be tightly controlled. The seal wear ring 290, 295 halves being tightly clamped together results in a fixed size ring being assembled with a highly variable mating diameter. In order to accommodate this, the inner diameter of the seal wear rings 290, 295 is made to clear the maximum assembled diameter of the clamping bands 170. As best shown in FIGS. 7-10, one or more split O-rings 330 are used to seal the gap or engagement interface between the clamping bands 170 and the seal wear rings 290, 295. The O-rings 330 will tolerate a large enough range of squeeze to provide sealing over the range of assembled clamping band 170 outer diameters. Depending upon the embodiment of the design, O-ring grooves 335 could be formed either in the inner diameter surface or bore of the seal wear rings 290, 295 (as shown) or on the outer diameter surface of the clamping bands 170. Cut O-rings 330 can then be inserted into the respective O-ring grooves 335.

The design should also prevent the seal wear rings 290, 295 from excessive axial or circumferential movement. Referring to FIGS. 6-10, in one embodiment, a projecting boss 340 is attached to the outer diameter surface 375 of the clamping bands 170. This boss 340 could be made by drilling a hole 345 and pressing a pin 350 into the outer diameter surface 375 of the clamping band 170. In another embodiment a threaded hole 345 could be used and a threaded fastener or other member 350 attached, such as a set screw, a cap screw, or a bolt. In these embodiments, the boss 340 is defined by the head of the pin, fastener, or member 350. In yet another embodiment, the boss 340 could be an independent feature attached with adhesive. In another embodiment the boss 340 could be integral to the clamping band 170 and could be produced during machining of the clamping band 170.

The hole 345 in the clamping band 170 is aligned with a mating aperture or recess in the inner diameter surface 358 of the seal wear rings 290, 295. One assembly technique could be to position the O-rings 330 on the clamping band 170 and then to bring the two halves of the seal wear rings 290, 295 together radially over the clamping band 170. However, with this technique, the O-rings 330 resist the alignment and clamp up of the seal wear ring 290, 295 halves. Therefore, the illustrated embodiments resolve this assembly problem by allowing the seal wear ring 290, 295 halves to be aligned away from the pillow block 110 and clamped together over the shaft 25 before installation into the assembly 100.

Figure 8:
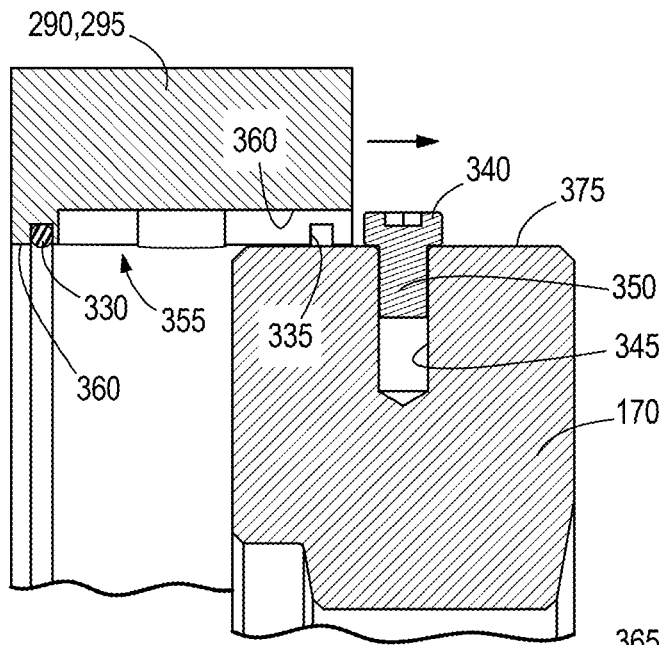
FIGS. 8-10 illustrate the installation process for mounting the seal wear ring on the clamping band.
Figure 9:
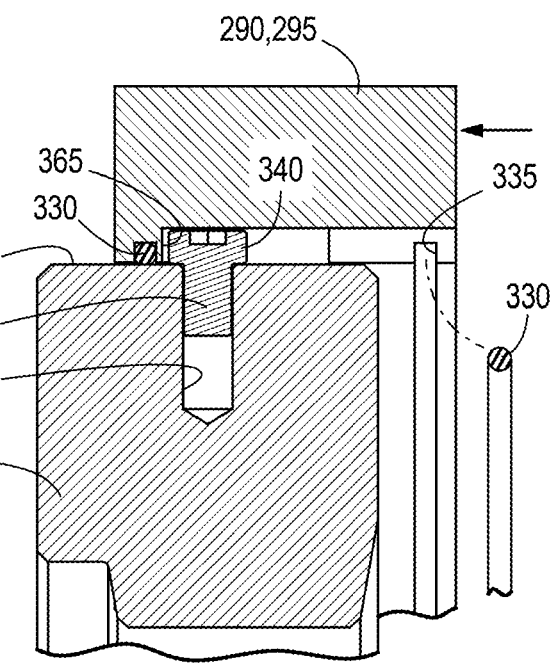
Figure 10:
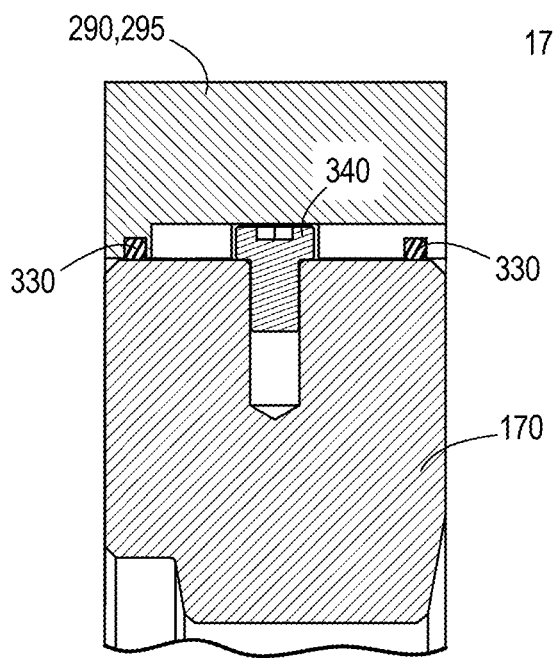
Figure 11:
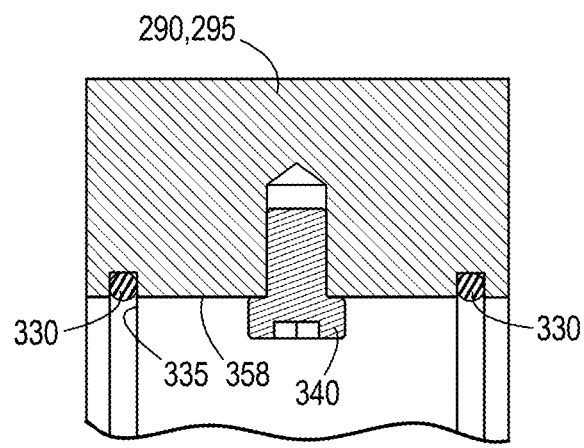
FIGS. 11-13 illustrate another embodiment of the engagement feature between the seal wear ring and the clamping band.
Figure 13:
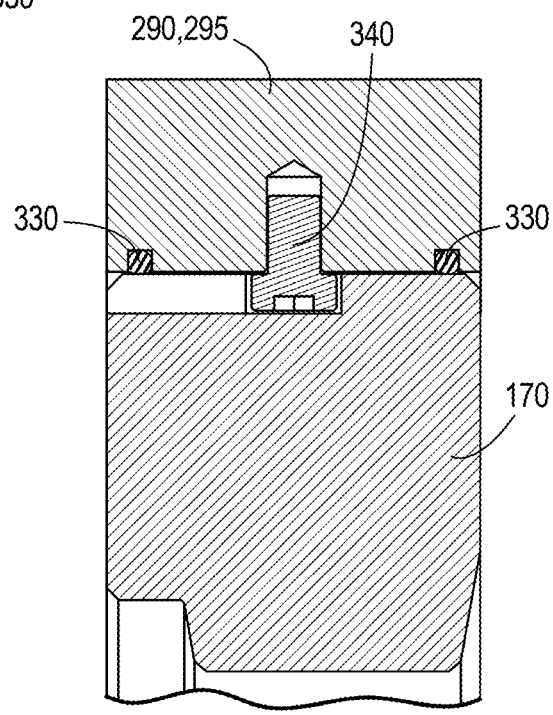
Figure 12:
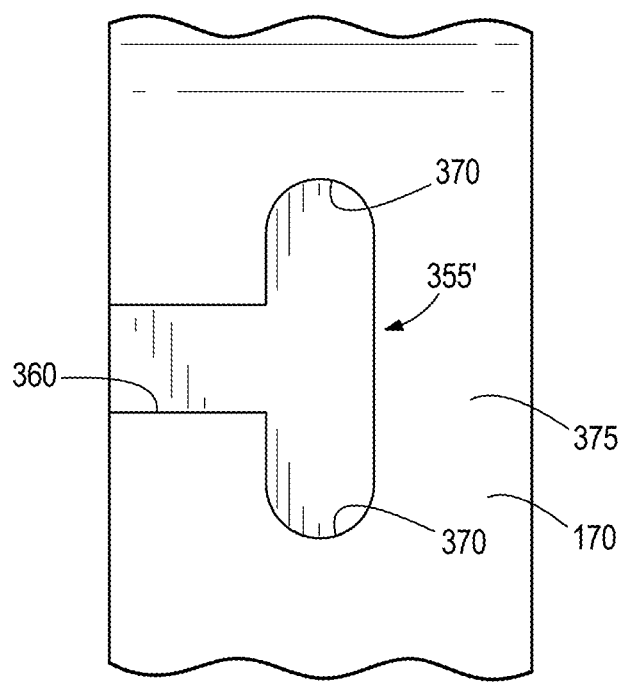

One manner of achieving this improved assembly technique is to utilize a "+" shaped aperture, recess, or slot 355 in the inner diameter surface 358 of the seal wear rings 290, 295. For assembly with this embodiment, the inner bearing rings 125, 130 and radial clamping bands 170 are assembled to the shaft 25. The roller cage compliment may be assembled either before or after the seal wear rings 290, 295, but with this design it is more convenient to assemble the roller and cage compliment afterwards. The bosses 340 are then inserted into the radial clamping bands 170. The seal wear ring 290, 295 halves are brought together over the shaft 25 at a location spaced axially from the bearing, and are aligned and clamped together. FIGS. 8-10 illustrate the installation procedure. For each seal wear ring 290, 295, the axially outboard O-ring 330 is inserted in the axially outboard O-ring groove 335. Then the slot 355 is aligned with the boss 340. Specifically, the slot 355 includes a first or entry portion 360 that opens to an axial edge of the seal wear rings 290, 295. This entry portion 360 is sized and configured to receive the boss 340 therein as the seal wear ring 290, 295 is moved axially toward the boss 340. The slot 355 further includes a second or extension portion 365 extending axially away from the entry portion 360, but not all the way to the opposite axial edge of the seal wear ring 290, 295. This extension portion 365 allows the seal wear ring 290, 295 to be axially pressed onto the clamping band 170 past a normal operating position in order to expose the axially inboard O-ring groove 335, as shown in FIG. 9. The axially inboard O-ring 330 is then placed in the groove 335 and the seal wear ring 290, 295 is pulled axially back to the normal operating position in which the axial edges of the seal wear rings 290, 295 generally align with the axial edges of the respective clamping bands 170, as shown in FIG. 10. The seal wear ring 290, 295 is then rotated in the direction of seal rotation (i.e., circumferentially) to lock the boss 340 into the appropriate third or locking portion 370 of the slot 355 (see the solid line position of the boss 340 in FIG. 6). The axial width of the locking portion 370 is selected (in combination with the size of the boss 340) to substantially prevent axial movement of the seal wear ring 290, 295 relative to the clamping band 170 once the boss 340 is positioned in the locking portion 370. The configuration of the illustrated slot 355 enables the two seal wear rings 290, 295 to be used interchangeably on either axial end of the assembly 100. In other words, the same part can be used for both seal wear rings 290, 295 due to the presence of the two, circumferentially-offset locking portions 370. In other embodiments, specific right and left seal wear rings 290, 295 could be used, and in that case, the locking portion 370 of the slot 355 need only be provided in the appropriate circumferential direction of seal rotation (as opposed to having the two distinct locking portions 370 extending in opposite circumferential directions away from the entry and extension portions 360, 365).

Further alternative embodiments shown in FIGS. 11-16 provide the boss 340 and the O-ring grooves 335 in the same component. In the embodiment shown in FIGS. 11-13, the boss 340 and the O-ring grooves 335 are all on the inner diameter surface 358 of the seal wear rings 290, 295. The same techniques described above for providing the boss 340 can be utilized when the boss 340 is positioned on the inner diameter surface 358 of the seal wear rings 290, 295. In this embodiment a "T" shaped slot 355' can be used on the outer diameter surface 375 of the clamping bands 170, as both O-rings 330 can be assembled before pushing the seal wear rings 290, 295 onto the radial clamping bands 170. No axial over-travel of the seal wear rings 290, 295 is required. The roller cage compliment can be assembled either before or after seal wear ring 290, 295 assembly.

Figure 14:
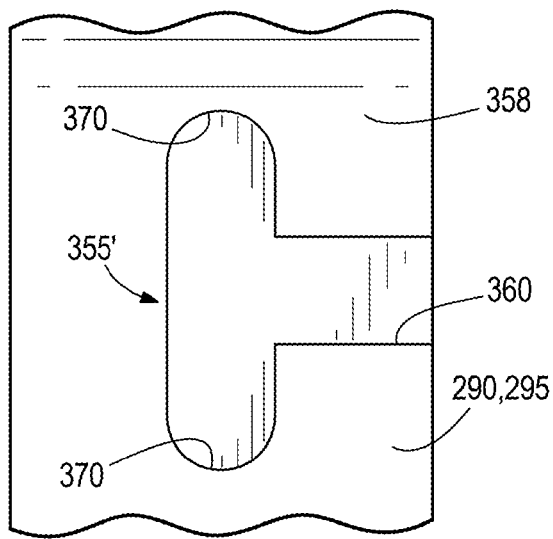
FIGS. 14-16 illustrate yet another embodiment of the engagement feature between the seal wear ring and the clamping band.
Figure 16:
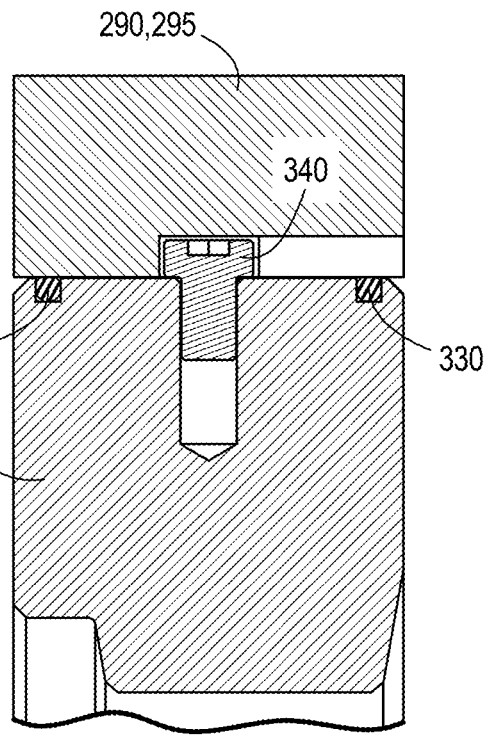
Figure 15:
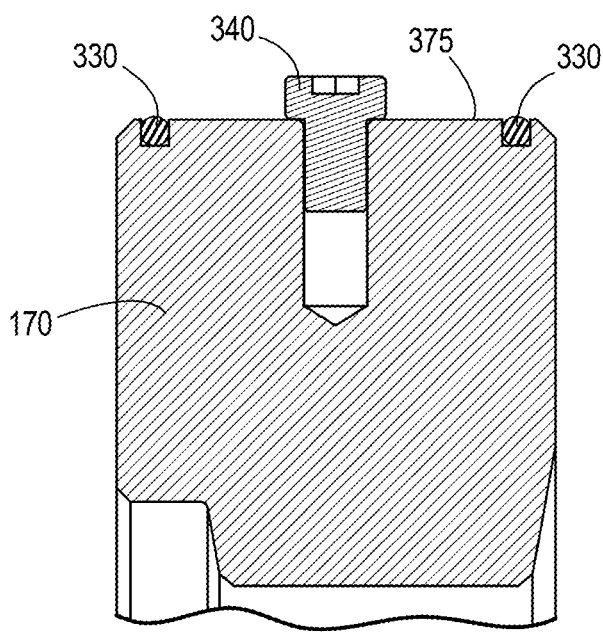

In the embodiment shown in FIGS. 14-16, the O-ring grooves 335 and the boss 340 are all on the outer diameter surface 375 of the radial clamping bands 170. The O-rings 330 are then retained during the assembly process and cannot fall out, dislodge, or become pinched. For assembly with this embodiment, the inner bearing rings 125, 130 and radial clamping bands 170 are assembled to the shaft 25. The roller cage compliments may be assembled on the inner ring 125, 130. The O-rings 330 are placed in the grooves 335 on the radial clamping bands 170 and the boss 340 is provided on the radial clamping bands 170. The seal wear ring 290, 295 halves are brought together over the 25 shaft away from the bearing and aligned and clamped together. The entry portion 360 of the "T" slot 355' in the inner diameter surface 358 of the seal wear ring 290, 295 is aligned with the boss 340 and the seal wear ring 290, 295 is axially pressed onto the radial clamping band 170. The seal wear ring 290, 295 is then rotated in the direction of seal rotation to lock the boss 340 into the locking portion 370 of the "T" shaped slot 355'. An "L" shaped slot could also be used, but the "T" shaped slot has the advantage of allowing use of an identical seal wear ring 290, 295 on each side of the bearing. An "L" shaped slot would need to be directional and would require two different seal wear rings 290, 295.

In each of the above embodiments, the cooperation between the slot 355, 355' and the boss 340 at the engagement interface between the seal wear ring 290, 295 and the clamping band 170 provides for improved assembly and axial retention of the seal wear ring 290, 295 relative to the clamping band 170.

Another feature that improves the expected operational life of the bearing is the design of the split of the inner race ring 115 where the components or halves 125, 130 come together. In the case where the split rolling element bearing is a tapered roller bearing, additional design considerations are required. The thrust rib 145 of the tapered roller bearing is designed to carry substantial roller end loads under sliding contact conditions. The gaps produced between the split bearing rib 145 must be treated differently than the split bearing raceway gap. The raceway gap is loaded by rolling contact, and by splitting the raceway at an angle, the load can be spread out and gradually passed over the raceway gap, leaving a majority of the contact patch supported at any given time. This results in a relatively smooth rolling motion over the raceway gap. To further avoid high edge stresses, the edges of the raceway split lines are often relieved. The angle of the gap and the relative direction of the angle to the roller axis may influence roller skewing as the roller passes over the gap. Whether the small end of the roller or the large end of the roller encounters the gap first may result in noticeable performance differences as the magnitude and direction of roller skewing will vary.

Testing has shown that it is preferred that the leading edge of an angled split should be toward the small end of the tapered roller. Many bearing applications such as wind turbines rotate primarily in one direction with rotation in the opposite direction occurring rarely and under low load conditions. These types of applications can see improved split bearing performance by using the preferential split angle direction that corresponds to the primary direction of rotation.

Typically for tapered roller bearings the inner ring 115 has the thrust rib 145. If cutting the inner race ring 115 at one constant split angle, the rib 145 will also be cut at an angle and the cut will not be perpendicular to the rib face tangency. This leaves one side of the cut with an acute angle and one side with an obtuse angle relative to the rib face tangency. The stiffness characteristics will be slightly different for each side of the cut and the rib-roller reaction will be different depending upon which side of the cut the roller is sliding off of, and which side it is sliding on to. Testing with cut angles from 6 to 20 degrees relative to the bearing axis 105 has shown improved rib-roller wear when the roller slides off of the obtuse angle side and onto the acute angle side.

Figure 17:
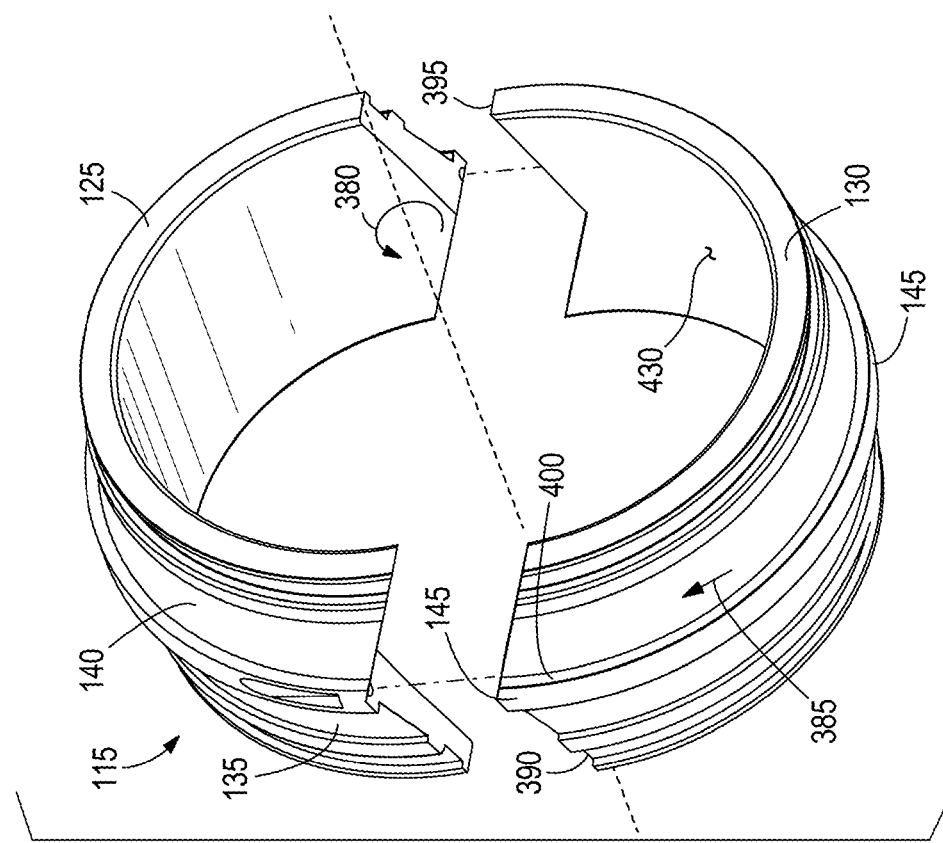
FIG. 17 is a perspective view illustrating the split components of the inner race ring of the split pillowblock and bearing assembly of FIG. 3.

The preferred split orientation is shown in FIGS. 3, 4, and 17. Referring to FIG. 17, the inner race ring rotation is counter clockwise about the Z axis, as indicated by the arrow 380. In this situation the rollers are then rolling clockwise relative to the inner race ring 115, as indicated by the arrow 385. Oppositely-directed "V" shaped split lines 390, 395 cut in the orientation shown in FIG. 17 provides the preferred split line orientation on both the raceways 135, 140 and the rib 145. As shown in FIG. 17, the split line 390 represents an inverted "V" shape, while the split line 395 represents a normally-oriented "V" shape. In other words, the split lines are diametrically opposed about the inner race ring 115 with one V-shaped split line 395 in an upright configuration and the other V-shaped split line 390 in an inverted configuration. The apices of the split lines 390, 395 are positioned at or near the axial center point of the rib 145. At both split locations, for both raceways 135, 140, the leading edge of the split 390, 395 is toward or adjacent the small diameter end of the approaching roller 150, 155 (see FIG. 5). At the rib 145, the large diameter end of the rollers 150, 155 slide along a rib face or rib tangency face 400 in a direction relative to the V-shaped split line 390, 395 such that the rollers 150, 155 slide off of the rib 145 where an obtuse angle is formed between a split face defined by the V-shaped split line 390, 395 and the rib tangency face 400, and on to the rib 145 where an acute angle is formed between the split face defined by the V-shaped split line 390, 395 and the rib tangency face 400. This is true at all split locations 390, 395.

Figure 18:
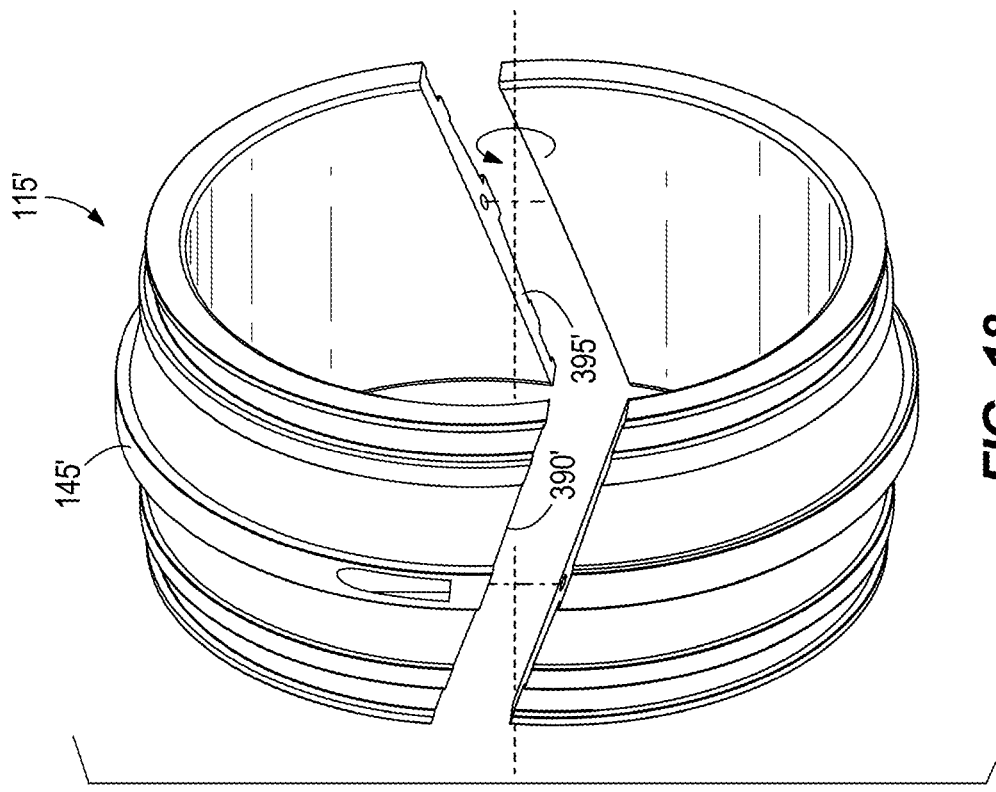
FIG. 18 is a perspective view illustrating the split components of an alternative inner race ring with a different split arrangement.

In an alternative embodiment shown in FIG. 18, for simplicity of cutting or splitting of the two-row, ribbed inner race ring 115', it may be desirable to use a straight, angled split line as shown, instead of the "V" shaped split shown in FIG. 17. In this case, the orientation of the splits 390', 395' should be in the preferential direction for the rib face on the row receiving the primary thrust load. On a wind turbine application with a rotating shaft and inner ring, as would be the case for a pillow block bearing main shaft application, the downwind row will be the seated row and the rib 145' will receive the primary thrust from that downwind row. This results in the asymmetrical split lines 390', 395' shown in FIG. 18.

Figure 19:
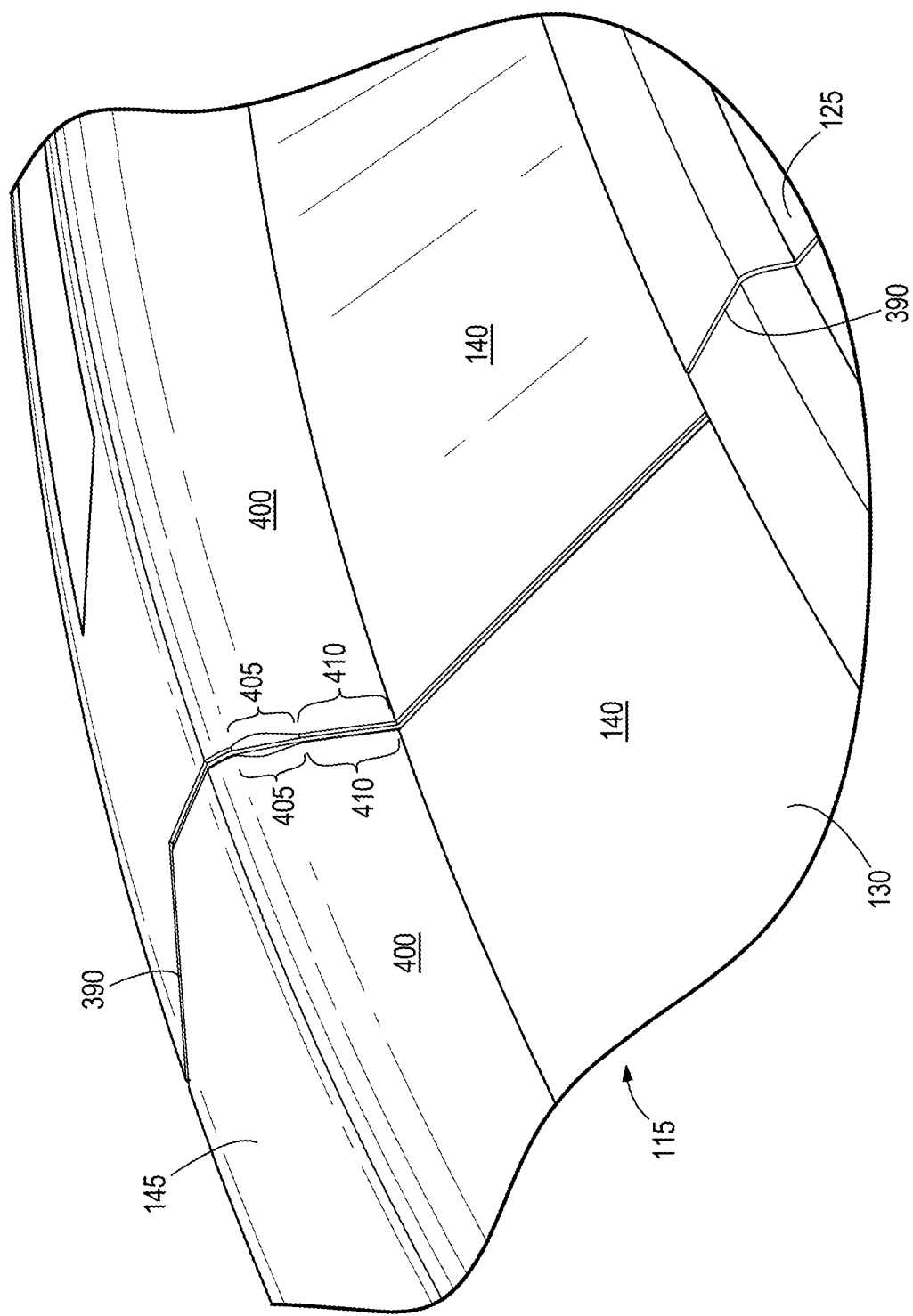
FIG. 19 is an enlarged partial perspective view illustrating the split line at the central rib of the inner race ring.

There is also a variation in a rib face-to-roller end reaction as the height of the contact location on the rib 145 varies. If the roller end to rib contact location is high (i.e., near an outer diameter location) on the rib 145, more relief is required at the split edge of the rib 145 than for lower contact height locations (i.e., closer to the raceways 135, 140). Testing has shown that an increased relief formed at the outer diameter portion of the edge break in the rib 145 reduces wear and damage to the roller ends. Specifically, FIG. 19 illustrates a variable width edge break formed at the split line 390 in the inner race ring 115. The same features discussed below are found at all four corresponding split line locations on the inner race ring 115.

The rib 145 has oppositely facing rib faces 400 (only one is shown in FIG. 19) where the larger diameter ends of the rollers 150, 155 slidingly engage. An outer diameter relief portion 405 is formed on each side of the split line 390 on the rib face 400. This outer diameter relief portion 405 will reduce wear and damage/degradation at the corresponding outer diameter location of the roller ends, yet is still small enough to minimize stress on the rollers 150, 155 as they pass over the split lines 390, 395. In the illustrated embodiment, the outer diameter relief portion 405 is a 0.010 inch or larger radius formed at the respective outer diameter corner portions of the rib 145. In other embodiments, a chamfer or edge break can be used instead of a radius, and may be machined manually (e.g., using a sharpening stone). The outer diameter relief portion 405 may extend up to half of the height of the rib face 400, but in the illustrated embodiment extends less than half of the height of the rib face 400, and is formed mainly at the outer diameter corner of the rib 145.

The edge break along the rib face 400 can be a variable-width edge break in the sense that the outer diameter relief portion 405 does not extend along the entire radial height of the rib face 400. In the illustrated embodiment an inner diameter relief portion 410 can be formed on each side of the split line 390 on the rib face 400 radially inside the outer diameter relief portion 405. This inner diameter relief portion 410 can be a radius of less than 0.010 inch, or alternatively can be a chamfer or edge break. Thus, the edge break relief varies in size in the radial direction of the rib face 400. In some embodiments, the edge break relief can vary in a linear or other mathematical relation along the radial direction of the rib face 400. In other embodiments, no inner diameter relief is formed.

Figure 20:
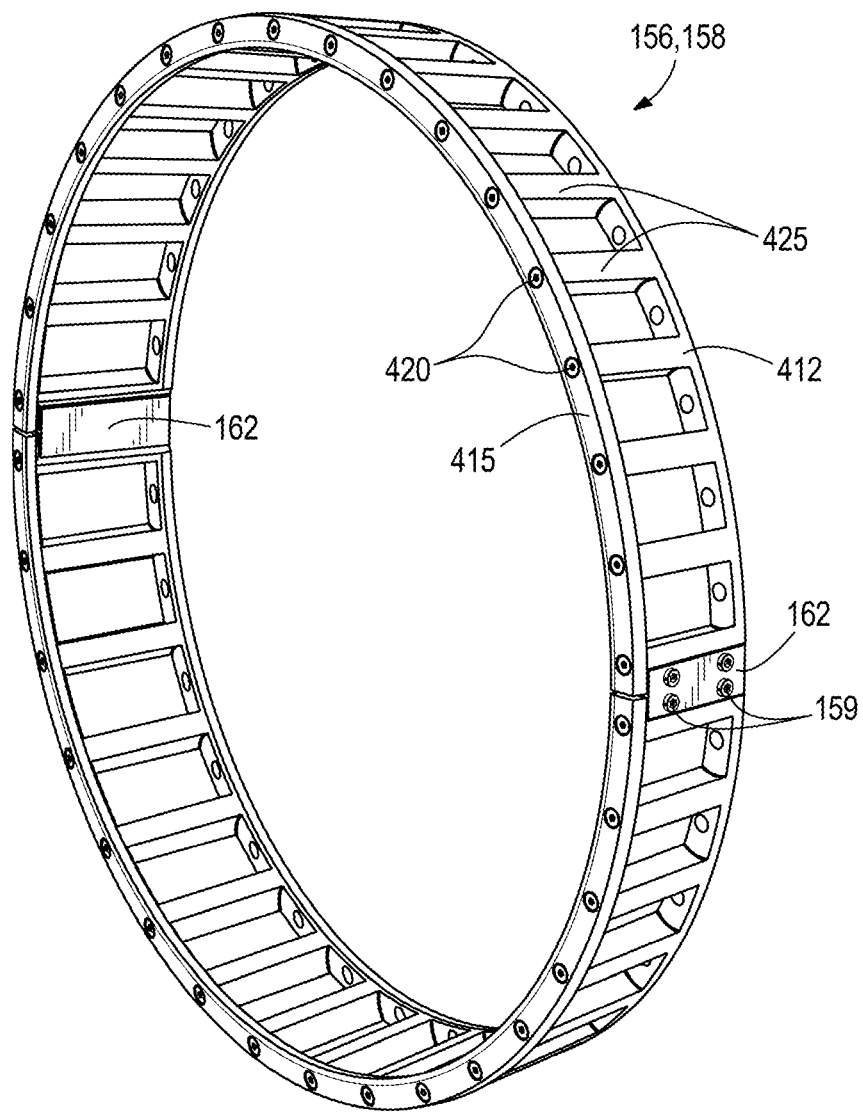
FIG. 20 is a perspective view of a cage assembly of the split pillowblock and bearing assembly of FIG. 3.

The split cages 156, 158 are shown in more detail in FIGS. 20-22. Only one cage is shown. To allow for ease of assembly, each cage 156, 158 is designed to retain the rollers 150, 155 in the cage pockets. The cages 156, 158 are designed as finger-style cages with a body portion 412 and a separable rib or large-end flange segment 415 attached to the body portion 412 at the large diameter side. In the embodiment shown, the separable flange segment 415 is attached to the body portion 412 with fasteners, which in the illustrated embodiment are cap screws 420. There is one fastener 420 connection to each bridge 425. The cages 156, 158 as shown would be manufactured as a full 360 degree cage with two wide bridges to allow for cutting and joining. In the embodiment shown, the cages 156, 158 are cut at approximately 180 degrees apart, depending upon whether an even or odd number of pockets are used. In alternate embodiments the cage could be made in three, four or more arc segments. More segments can be used to lessen weight for handling, but with the trade-off that fewer rollers 150, 155 can be used in order to make up for the extra wide bridges needed for cutting. This would result in a lower bearing load rating. Cage material for this style cage is typically brass, bronze or steel.

The bridges 425 of the body portion 412 are nominally near the roller pitch diameter. The sides of the bridges 425 facing the rollers 150, 155 are curved at a slightly larger radius than the rollers 150, 155 at any axial position. The illustrated links 162 take the form of an "H" shaped clip (i.e., H-shaped in cross-section) used to join the arc segments, and are aligned as to keep the cage segments round upon assembly. The "H" clips 162 are positioned on the cage segment so as to restore the kerf distance between segments that was lost in cutting. Rollers 150, 155 are assembled small end first into the pockets made between the bridges 425 and the large end flange segment 415 is then attached. Typically the "H" clip 162 will be attached to a bridge 425 at one end of the cage segment before bearing assembly, then the segments will be brought together over the clamped inner raceway ring 115 and the "H" clips 162 will be joined to a bridge 425 of the opposing cage segment to make a full 360 degree assembled cage.

To prevent loosening of the fasteners 159 and/or 420, several methods of retention are possible, including adhesives, lock washers, peening separately or in combination. Testing has shown that adhesives and peening provide the best fastener retention. Peening is effective for permanent assembly but typically prevents disassembly. Adhesives can be chosen to provide various resistances to rotation and can be chosen for a permanent level attachment or a serviceable level of attachment.

An additional feature of the illustrated bearing design addresses fretting between the shaft 25 and the inner raceway ring 115 by applying an anti-fretting coating (depicted schematically at 430 in FIG. 17) to the bore of the inner raceway ring 115. Anti-friction coatings with solid lubricants are particularly effective as anti-fretting coatings. Common solid lubricants are: molybdenum disulfide, PTFE (Polytetrafluoroethylene), graphite, hexagonal boron nitride and tungsten disulfide. The coatings can be organic resin systems, water-based, or solvent-based to hold these solid lubricants. Coatings containing PTFE have performed very well in testing. Excellent fretting resistance can be obtained with thin film coatings having a thickness in the range of 5-15 microns. These thin films are within the tolerance variation of the inner raceway ring bore and shaft fit so they do not significantly affect inner raceway ring size as assembled. However, if desired, the inner raceway ring bore size can be adjusted to compensate for the film thickness. One exemplary film is Molykote D-708 available from Dow Corning. This heat-cured coating is a dispersion of solid lubricants in an organic resin system. Another exemplary coating is Molykote D321, also from Dow Corning, which is a similar product that air dries without heating. It is sprayed or brushed on and is typically 5-20 microns thick. Both films were effective in testing. An alternate and less expensive option is to apply an anti-fretting paste as the coating 430 to the inner raceway ring bore at assembly. The product can be sprayed or dipped and is then heat cured for 20 minutes at 200 C. The coating is typically 5-15 microns thick.

Various features and advantages of the invention are set forth in the following claims.

What is claimed is:

1. A bearing assembly comprising:
   a split inner race ring having first and second components configured to be installed and connected together on a shaft, each component of the split inner race ring defining two raceways for supporting rolling elements in a two-row orientation;
   a split clamping band having first and second components configured to be installed and connected together over the split inner race ring to secure the split inner race ring on the shaft;
   a split seal wear ring having first and second components configured to be installed and connected together on an outer diameter surface of the split clamping band;
   wherein an engagement interface between the split clamping band and the split seal wear ring includes a boss on one of the split clamping band and the split seal wear ring, and an aperture on the other one of the split clamping band and the split seal wear ring, the aperture sized and configured to receive the boss for positioning the split seal wear ring on the split clamping band;
   a sealing arrangement having a seal in sealing engagement with an outer diameter surface of the split seal wear ring;
   a first split outer race ring having first and second components configured to be installed around the shaft, each component of the first split outer race ring defining a raceway for supporting a first row of the two rows of rolling elements; and a second split outer race ring having first and second components configured to be installed around the shaft, each component of the second split outer race ring defining a raceway for supporting a second row of the two rows of rolling elements.

2. The bearing assembly of claim 1, wherein the aperture is a slot that includes an entry portion that opens to an axial edge of the respective split clamping band or split seal wear ring, the entry portion sized and configured to receive the boss therein as the seal wear ring is moved axially toward the split clamping band to allow installation of the split seal wear ring onto the split clamping band in an axial direction.

3. The bearing assembly of claim 2, wherein the slot further includes a locking portion circumferentially offset from the entry portion, the locking portion operable to receive the boss when the split seal wear ring is rotated circumferentially with respect to the split clamping band, thereby preventing removal of the split seal wear ring from the split clamping band in the axial direction.

4. The bearing assembly of claim 3, wherein the locking portion is a first locking portion offset in a first circumferential direction from the entry portion, and wherein the slot further includes a second locking portion offset from the entry portion in a second circumferential direction, opposite the first circumferential direction.

5. The bearing assembly of claim 3, wherein the slot is formed in the split seal wear ring and further includes an extension portion extending axially away from the entry portion, but not all the way to an opposite axial edge of the split seal wear ring, the extension portion sized and configured to allow the split seal wear ring to be axially pressed onto the split clamping band past a normal operating position in order to expose an axially inboard O-ring groove formed on an inner diameter surface of the split seal wear ring.

6. The bearing assembly of claim 1, wherein the aperture is in an inner diameter surface of the split seal wear ring, and the boss is on an outer diameter surface of the split clamping band.

7. The bearing assembly of claim 1, wherein the aperture is on an outer diameter surface of the split clamping band, and the boss is on an inner diameter surface of the split seal wear ring.

8. The bearing assembly of claim 1, further comprising a seal ring positioned at the engagement interface between the split clamping band and the split seal wear ring.

9. The bearing assembly of claim 8, wherein the seal ring is a first seal ring positioned on a first axial side of the boss, and wherein the engagement interface further includes a second seal ring positioned on a second axial side of the boss.

10. The bearing assembly of claim 8, wherein the seal ring is positioned in a groove formed on an inner diameter surface of the split seal wear ring.

11. The bearing assembly of claim 8, wherein the seal ring is positioned in a groove formed on an outer diameter surface of the split clamping band.

12. The bearing assembly of claim 1, wherein the boss is the head of a pin or fastener installed into an aperture in one of the split seal wear ring or the split clamping band.

13. The bearing assembly of claim 1, wherein the boss is secured to one of the split seal wear ring or the split clamping band via an adhesive.

14. The bearing assembly of claim 1, further comprising a split pillowblock having first and second components configured to be installed and connected together around a mainshaft of a wind turbine, the split pillowblock being supported by a bedplate of the wind turbine.

15. A method of installing a split seal wear ring onto a split clamping band of a split bearing assembly, wherein an engagement interface between the split clamping band and the split seal wear ring includes a boss on one of the split clamping band and the split seal wear ring, and a slot on the other one of the split clamping band and the split seal wear ring, the slot including an entry portion that opens to an axial edge of the respective split clamping band or the split seal wear ring, and a locking portion circumferentially offset from the entry portion, the method comprising:

aligning the entry portion of the slot with the boss, with the split seal wear ring spaced axially from the split clamping band;

moving the split seal wear ring axially such that the boss is received in the entry portion of the slot; and rotating the split seal wear ring circumferentially relative to the split clamping band such that the boss is received in the locking portion of the slot.

\* \* \* \* \*